United States Patent [19]
Chauhan

[11] Patent Number: 5,921,732
[45] Date of Patent: Jul. 13, 1999

[54] WING MEMBER FOR AIRCRAFT BAGGAGE HANDLING APPARATUS

[76] Inventor: Hemraj Chauhan, 32 N. Wood Rd., Camarillo, Calif. 93010

[21] Appl. No.: 09/081,673
[22] Filed: May 19, 1998
[51] Int. Cl.[6] ........................................................ B60P 7/08
[52] U.S. Cl. .................................. 410/77; 410/69; 410/94
[58] Field of Search ................................. 410/77, 80, 69, 410/94; 244/118.1, 137.1; 414/536; 248/500

[56] References Cited

U.S. PATENT DOCUMENTS

| | | | |
|---|---|---|---|
| 4,349,302 | 9/1982 | Ferguson, Jr. | 410/69 |
| 4,379,668 | 4/1983 | Pelletier | 410/77 |
| 4,696,609 | 9/1987 | Cole | 410/69 |
| 5,573,359 | 11/1996 | Moradians | 410/69 |
| 5,692,862 | 12/1997 | Hilde | 410/69 |
| 5,816,758 | 10/1998 | Huber | 410/77 |
| 5,871,317 | 2/1999 | Huber et al. | 410/69 X |

Primary Examiner—Stephen T. Gordon
Attorney, Agent, or Firm—Gene W. Arant

[57] ABSTRACT

A wing member for a pallet restraint mechanism is described which is formed of an integrally formed metal casting. The member includes a plate-like main body with a tapered portion extending from a generally rectangular portion. A plurality of spaced support arms extend downward from the main body and include align apertures to receive a common shaft. Two of the support arms include lugs for engaging a stop member to limit their rotation about the shaft and further include camming surfaces for controlling the rotational position of the wing member. A clamping shelf extends perpendicularly from an upper edge of the main body. The device includes additionally a rectangular latch portion extending from the main body in a common plane with the plate-like form of the body. The latch portion includes a notch at one end and an opening at an intermediate portion for engaging structure of the restraint mechanism.

2 Claims, 2 Drawing Sheets

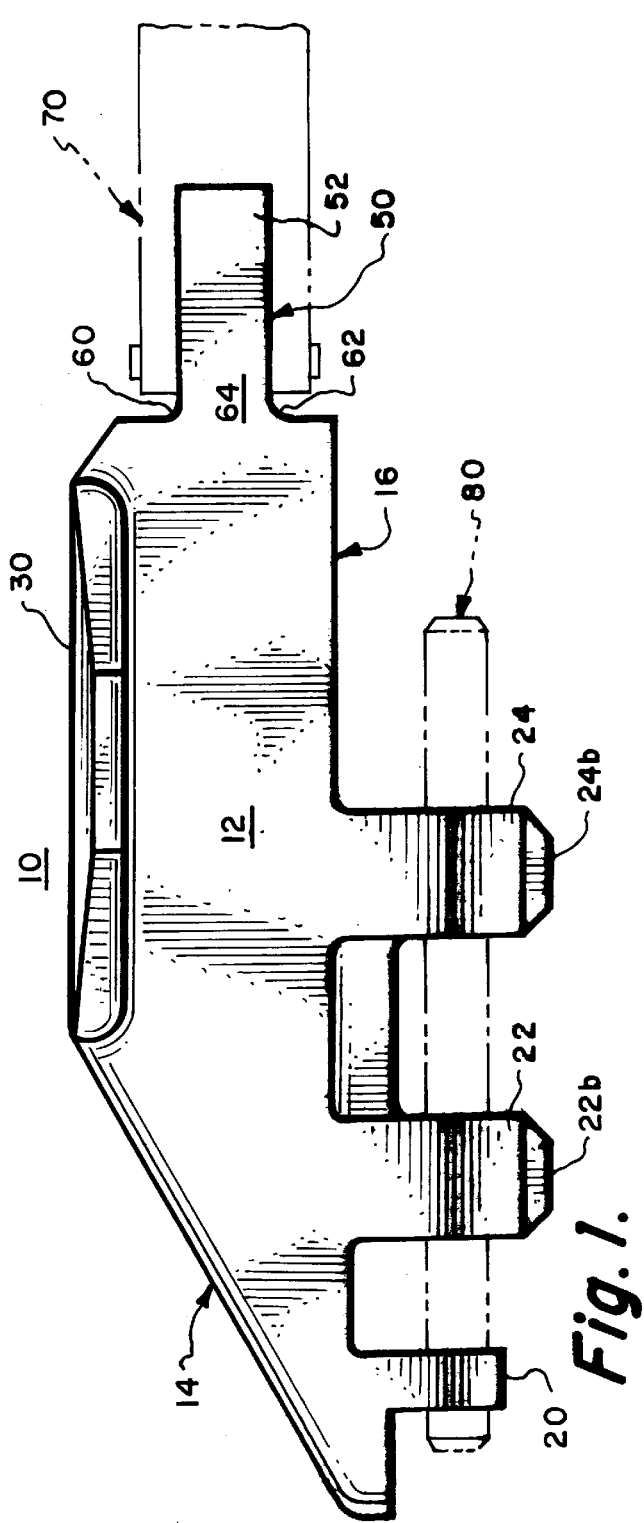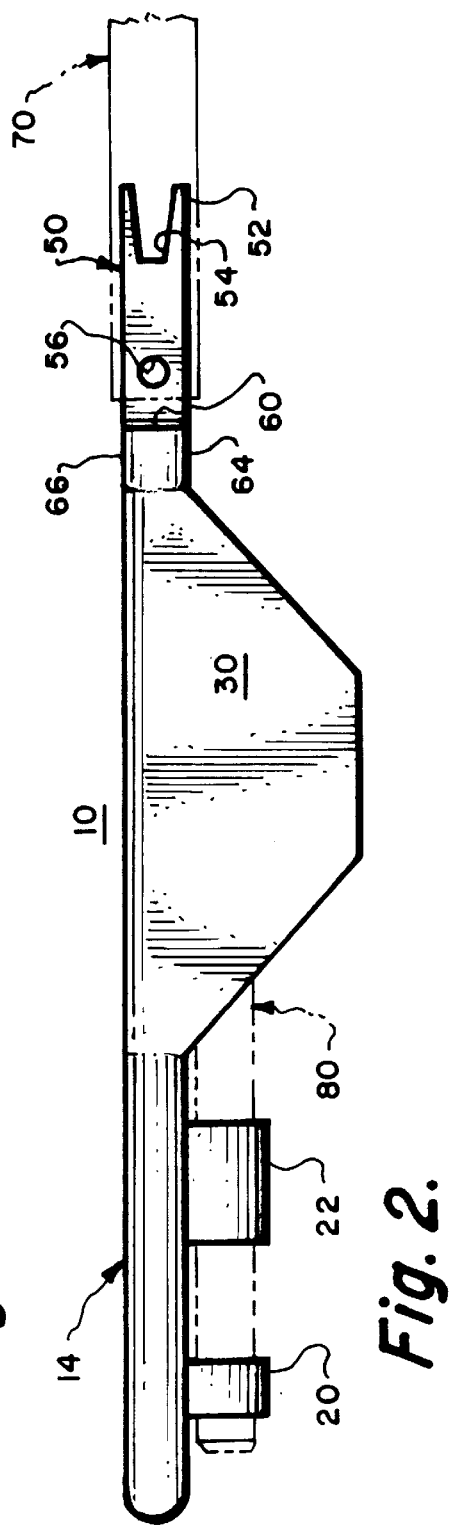

WING MEMBER FOR AIRCRAFT BAGGAGE HANDLING APPARATUS

FIELD OF THE INVENTION

The present invention relates to mechanical apparatus used in the handling of aircraft baggage.

BACKGROUND OF THE INVENTION; AND PRIOR ART

As air travel continues to increase, so do the demands for the handling of aircraft baggage, including personal luggage as well as items of many other kinds. It is well known to use pallets for the handling of such baggage. In the prior art there has been an established practice of using pallets of either regular or full width, or else half width, to support the baggage while it is being transported. A loading system for loading the pallets on an aircraft must automatically adjust itself to the handling of whichever width of pallet is being presented to it at a particular moment.

Mechanical systems of this general type have long existed—see, for example, U.S. Pat. No. 3,374,604 issued Mar. 26, 1968 for Automatic Carton Handling Machine—but each system tends to be somewhat unique, as are the problems attendant upon its usage. For the aircraft pallets, a commonly used system of apparatus is that shown in U.S. Pat. No. 4,696,609 issued Sep. 29, 1987. The pallet restraint mechanism shown in that patent includes a rotatably supported wing member 44 that has a plate-like main body and a latch portion of generally rectangular configuration which extends longitudinally from one end of the main body. The latch portion is connected to a central bar 48. Rotatable movement of the central bar may drive the wing member in rotation through an arcuate movement of about ninety degrees; or, alternatively, rotation of the wing member may drive the rotation of the central bar in a like rotary movement.

A long-standing problem of the apparatus referred to above has been the occasional failure or breakage of the wing member. The wing member has tended to crack at the interface between its latch portion and its main body portion. This has necessitated shutting down the baggage transfer operation while repairs are made or another method of handling can be called into action.

An individual replacement part such as a wing member is not expensive. The hitherto unsolved problem has been that failure of the wing member usually occurs during the process of either loading or unloading an aircraft, with consequent delays in completing the baggage transfer operation. While such delays may seem unimportant to a manufacturer who supplies the system of apparatus and is therefore in a position to profitably sell replacement parts as well, to a passenger who is waiting in an airport terminal for arrival of his or her baggage the delay can be very serious.

SUMMARY OF THE INVENTION

According to the present invention the latch portion of the wing member is modified so that it is concavely curved in a direction parallel to the main body on both its upper and lower surfaces where it joins the main body, but retains a smooth and contiguous surface on each of the lateral sides where the latch portion adjoins the main body.

DRAWING SUMMARY

FIG. 1 is a side elevation view of my improved wing member, showing in dotted lines the position of a cooperating member that would be secured to it;

FIG. 2 is a top plan view; and

DETAILED DESCRIPTION

Figure 3:
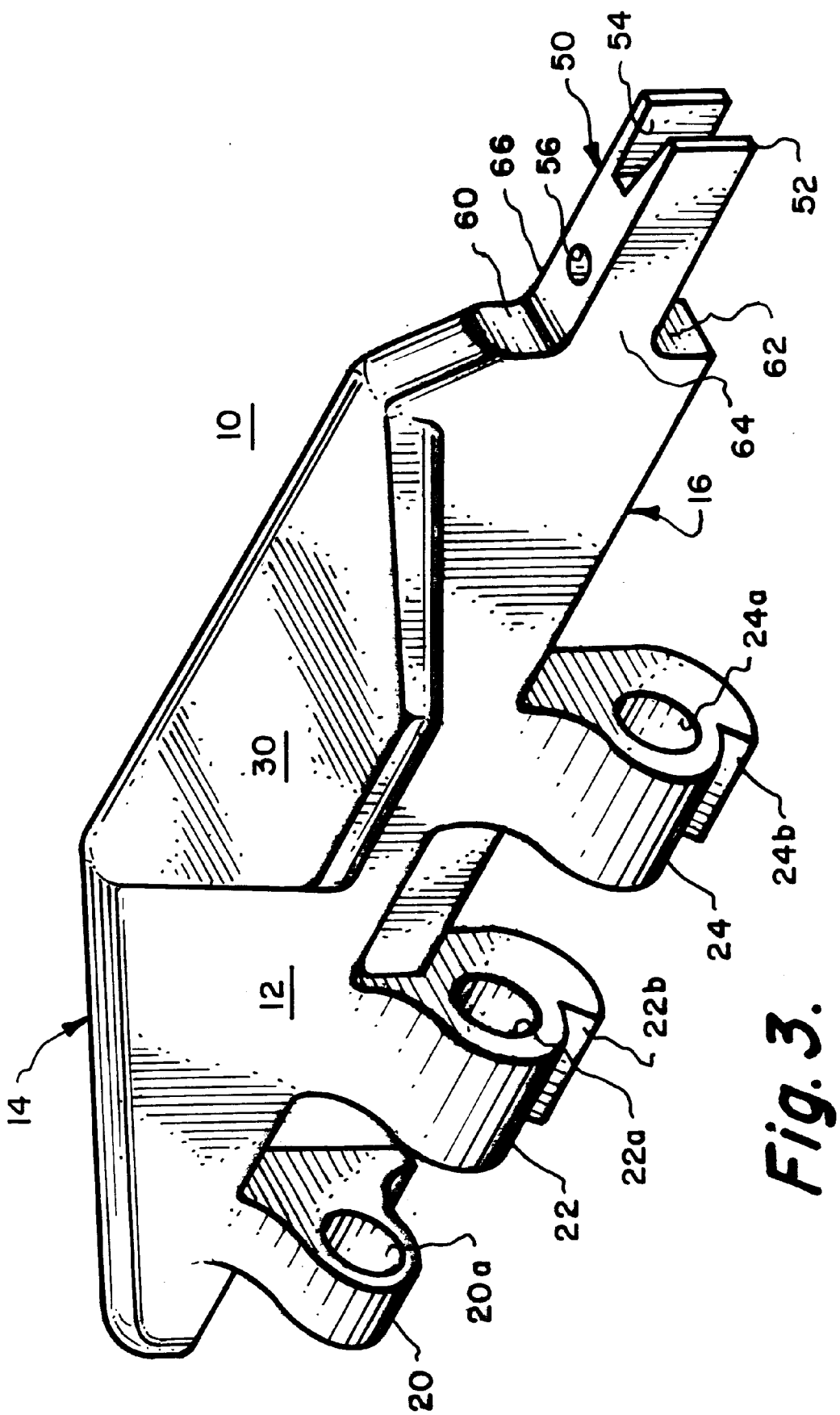
FIG. 3 is a perspective view.

Referring now to the drawings, my novel wing member is identified by numeral 10, while the position of a cooperating central bar that may drive the wing member in rotation, or be driven in rotation by it, is indicated by numeral 70.

The wing member comprises an integrally formed metal casting including an elongated plate-like main body 12 having a tapered end portion 14 and a relatively rectangular end portion 16. Three longitudinally spaced support arms 20, 22, 24, extend downward from the main body. The two support arms 20 and 22 are disposed beneath the tapered end portion 14 of the main body 12, and the support arm 24 is disposed beneath the generally rectangular end portion 16 of the main body 12.

It will be noted that the support arms 20, 22, 24, have mutually aligned openings 20a, 22a, 24a, for being rotatably supported upon a common shaft 80, shown only in phantom in FIGS. 1 and 2.

Two of the support arms 22 and 24 have lug means 22b, 24b, for engaging a stop member, not shown, and thereby limiting their rotation upon the common shaft 80. They also have lower extremities upon which camming surfaces are formed for controlling the rotational position of the wing member.

A clamping shelf 30 extends longitudinally along the upper edge of the main body 12 and also extends perpendicularly therefrom in a lateral direction. All three of the support arms protrude laterally from the main body 12 in the same direction as the clamping shelf 30 but not in the opposite direction.

The wing member 10 has a latch portion 50 which extends from the generally rectangular end portion 16 of the main body 12 and in a common plane with its plate-like form. The latch portion 50 is of rectangular cross-section, having an outer end 52 with a notch 54 therein that extends parallel to the plate-like portion of the main body. Latch portion 50 also has at an intermediate point on its length, for securement to a cooperating member, an opening 56 that extends through the latch portion parallel to the notch.

According to the invention the latch portion is concavely curved in a direction parallel to the main body on both its upper and lower surfaces where it joins the main body, these surfaces being identified by reference numerals 60 and 62, respectively. But each of the lateral sides where the latch portion adjoins the main body forms a smooth contiguous surface, those surfaces being identified by numerals 64 and 66, respectively.

The use of such concave surfaces 60, 62, might have been obvious if the breakage problem were due to a bending movement of central bar 70 relative to the wing member 10 in the plane of its main body 12. But the actual problem that has existed for some years now is the result of torque resulting from the twisting of the main body 12 and the latch portion 50 relative to each other about the longitudinal axis of the rectangular portion 16 of the wing member.

While the presently preferred embodiment of the invention has been disclosed in detail in order to comply with requirements of the patent laws, it will be understood by those skilled in the art that some variations may be possible within the concept of the invention. It will therefore be understood that the scope of the invention is to be determined only in accordance with the appended claims.

What I claim is:

1. A wing member for a pallet restraint mechanism comprising an integrally formed metal casting including:

an elongated plate-like main body, having a tapered end portion and a relatively rectangular end portion;

three longitudinally spaced support arms extending downward from the main body, two of the support arms being disposed beneath the tapered end portion of the main body, and one being disposed beneath the generally rectangular end portion of the main body;

the support arms having mutually aligned openings for being rotatably supported upon a common shaft;

two of the support arms having lug means for engaging a stop member and thereby limiting their rotation upon the common shaft, and also having lower extremities upon which camming surfaces are formed for controlling the rotational position of the wing member;

a clamping shelf extending longitudinally along the upper edge of the main body and also extending perpendicularly therefrom in a lateral direction, the support arms protruding laterally from the main body in the direction of the clamping shelf but not in the opposite direction;

the main body having a latch portion thereof which extends from its generally rectangular end portion and in a common plane with its plate-like form;

the latch portion being of rectangular cross-section, having an outer end with a notch therein that extends parallel to the main body, and also having at an intermediate point on its length, for securement to a cooperating member, an opening that extends through the latch portion parallel to the notch; and the latch portion being concavely curved in a direction parallel to the main body on both upper and lower surfaces where it joins the main body, but each of adjoining lateral sides of the main body and latch portion forming a smooth contiguous surface.

2. A wing member for a pallet restraint mechanism comprising an integrally formed metal casting including:

an elongated plate-like main body having a relatively rectangular end portion;

a plurality of support arms extending downward from the main body, having mutually aligned openings for being rotatably supported upon a common shaft;

the main body having a latch portion thereof which extends from its relatively rectangular end portion and in a common plane with its plate-like form;

the latch portion being of rectangular cross-section, having an outer end with a notch therein that extends parallel to the main body, and also having at an intermediate point on its length, for securement to a cooperating member, an opening that extends through the latch portion parallel to the notch; and the latch portion being concavely curved in a direction parallel to the main body on both upper and lower surfaces where it joins the main body, but each of adjoining lateral sides of the main body and latch portion forming a smooth contiguous surface.

* * * * *